US006024893A

United States Patent [19]

Keil et al.

[11] Patent Number: 6,024,893
[45] Date of Patent: Feb. 15, 2000

[54] METHOD FOR CONTROLLING A NITRIDING FURNACE

[75] Inventors: Gary D. Keil, Elmwood; Sheryl A. Tipton, East Peoria; Philip A. Newman, Pekin; Paul E. Hoernlein, Peoria, all of Ill.

[73] Assignee: Caterpillar Inc., Peoria, Ill.

[21] Appl. No.: 09/104,021

[22] Filed: Jun. 24, 1998

[51] Int. Cl.[7] ................................ C01B 3/04; C23C 8/24

[52] U.S. Cl. ........................................ 252/374; 148/206

[58] Field of Search ........................ 148/206; 423/351; 252/374

[56] References Cited

U.S. PATENT DOCUMENTS

| | | | |
|---|---|---|---|
| 5,320,818 | 6/1994 | Garg et al. | 423/351 |
| 5,322,676 | 6/1994 | Epting | 423/351 |
| 5,348,592 | 9/1994 | Garg et al. | 148/206 |
| 5,695,731 | 12/1997 | Domergue et al. | 423/351 |

FOREIGN PATENT DOCUMENTS

| | | | |
|---|---|---|---|
| 4229803A1 | 3/1994 | Germany . | |
| 831814 | 5/1981 | Russian Federation | 148/206 |
| 1474077 | 4/1989 | Russian Federation | 252/374 |
| 2184549A | 6/1987 | United Kingdom . | |

OTHER PUBLICATIONS

Article: Oxygen Probes For Controlling Nitriding and Nitrocarburising Atmospheres by H.J. Spies, H.J. Berg, and H. Zimdars Sep. 16, 1993.

Final Programme and Book of Abstracts: 10th Congress of the International Federation for Heat Treatment & Surface Engineering Sep. 1–5, 1996.

*Primary Examiner*—Wayne Langel
*Attorney, Agent, or Firm*—Robert A. McFall; J. W. Burrows

[57] ABSTRACT

Dissociated ammonia carrier gas used as a reference gas is obtained from an ammonia dissociator which also provides dissociated ammonia carrier gas to a nitriding furnace whereby the source of ammonia supply gas is the same. An oxygen probe is used to regulate the nitriding potential of a nitriding furnace and atmosphere for process control and high quality nitrided parts. The method further includes correlating the probe mV output signal to a nitriding potential and adjusting the ratio of ammonia supply gas to dissociated ammonia carrier gas at the inlet of the nitriding furnace.

6 Claims, 1 Drawing Sheet

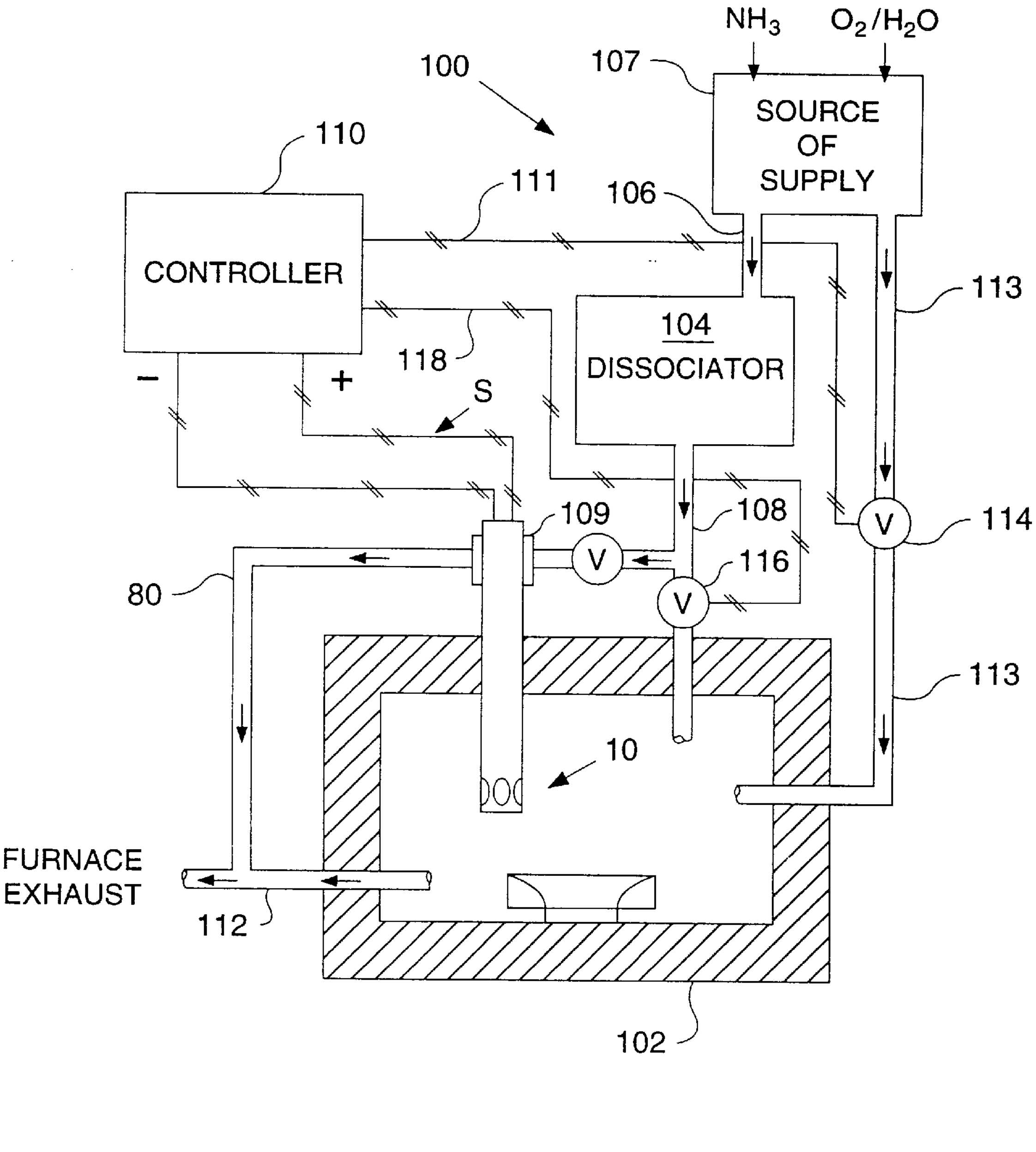
NH3
O2/H2O
107
100
SOURCE OF SUPPLY
110
111
106
CONTROLLER
113
104 DISSOCIATOR
118
S
109
108
114
116
80
113
10
FURNACE EXHAUST
112
102

METHOD FOR CONTROLLING A NITRIDING FURNACE

TECHNICAL FIELD

This invention relates generally to a method of using an oxygen probe to control the atmosphere of a nitriding furnace, and more particularly, to such a method which measures the oxygen partial pressure of the nitriding furnace atmosphere using dissociated ammonia as the reference gas for the oxygen probe.

BACKGROUND ART

Various methods of performing the nitriding process are known to those skilled in the art. In some cases, the process is performed by providing raw ammonia to the nitriding furnace and sometimes the process is performed by providing the furnace with raw ammonia combined with a carrier gas mixture of nitrogen and hydrogen formed by the dissociation of ammonia in an ammonia dissociator. It is desirable to control the nitriding potential within the furnace. This can be done in a number of ways. For example, it is known that the oxygen partial pressure in the nitriding atmosphere can be measured and used to control the nitride potential provided that the supply of ammonia contains small amounts of impurities in the form of oxygen or oxygen containing compounds such as water. One arrangement is described by S. Bohmer, et al., in Oxygen Probes for Controlling Nitriding and Nitrocarburizing Atmosphere, published in *Surface Engineering*, v. 10, #2, 1994, pp.129–135. In the Bohmer arrangement, a special probe, referred to as an equilibrium probe (E probe) produced by Process Electronic Company, uses a heated catalyst within the probe to dissociate any residual ammonia of the furnace atmosphere before coming in contact with the furnace atmosphere sensing element of the probe. Problems with the Bohmer suggested sensing system arise from the assumptions that all of the ammonia is dissociated by the heated catalyst prior to contact with the furnace atmosphere sensor of the E probe and that the temperature difference between the furnace atmosphere sensor and the reference sensor are insignificant. In actual practice, both assumptions can be faulty and give rise to errors which are detrimental to accurate process control and the quality of nitrided articles.

More recently, U.K. patent application GE 2,184,549A by Dr. Hans-Heinrich Moebius et al. uses an arrangement of four sensors to control the atmosphere of a nitriding furnace. Separate sensors measure the treatment gas oxygen partial pressure in the furnace atmosphere and a second sensor, in conjunction with a heated catalyst path, supplies a separate, remote, reference gas measurement. This arrangement has the disadvantages of requiring multiple probes, separate temperature measurements, and heated catalytic internal passageways.

Another arrangement is discussed in unexamined patent application DE 42 29 803 A1, by R. Hoffman. The described method requires that a portion of the waste gas stream is shunted out of the furnace and delivered to a separate dissociation unit outside of the furnace space. This arrangement has the disadvantages of requiring an additional dissociation chamber strictly to fully dissociate the furnace sampling gas.

The present invention is directed to overcoming the problems set forth above. It is desirable to have a method for controlling the atmosphere of a nitriding furnace using an oxygen probe which does not require the use of internal catalysts and heating elements to provide a reference gas for the probe. It is also desirable to have such a method which requires only a single probe to control a single furnace. Furthermore, it is desirable to have such a method that does not require additional dissociators beyond those already present to produce a dissociated ammonia carrier gas, heating elements and electrical inputs, thereby enabling the method to be readily used in otherwise conventional nitriding systems. The present invention overcomes the above noted problems by the novel method of using a single conventional oxygen probe supplied with a reference gas taken from the already present dissociated ammonia carrier gas. By using a conventional oxygen probe, the complex dissociator internal to the prior art probes and associated temperature problems are eliminated. Because the dissociated ammonia reference gas is produced in a commercial dissociator designed specifically to produce complete dissociation, the problems with incompletely dissociated reference gas are eliminated.

DISCLOSURE OF THE INVENTION

In one aspect of the present invention, a method of controlling the nitriding potential of a nitriding furnace is provided and includes the steps of providing a source of ammonia supply gas containing ammonia and oxygen, delivering a portion of the ammonia supply gas to a dissociator, delivering another portion of the ammonia supply gas to the nitriding furnace, dissociating the ammonia supply gas within the dissociator to a dissociated ammonia carrier gas, dividing the dissociated ammonia carrier gas into a first portion and a second portion, delivering the first portion of the dissociated ammonia carrier gas to the nitriding furnace, delivering the second portion of the dissociated ammonia carrier gas to an oxygen probe as a reference gas for the oxygen probe, sensing the oxygen partial pressure differential within the oxygen probe predisposed in the furnace atmosphere, producing a signal correlation of the oxygen partial pressure differential relative to the nitriding potential, and controlling the ratio of ammonia supply gas to dissociated ammonia carrier gas at the inlet of the nitriding furnace in response to the signal correlation.

Other features of the method of controlling the atmosphere of a nitriding furnace, embodying the present invention, includes controlling the gas flow of dissociated ammonia carrier gas to the furnace, where the supply of ammonia to the dissociator as well as the nitriding furnace is from the same supply source.

BRIEF DESCRIPTION OF THE DRAWINGS

A more complete understanding of the operation of the present invention may be had by reference to the following description when taken in conjunction with accompanying drawing which is a schematic diagram of a system, embodying the present invention, for controlling the environment of a nitriding furnace.

BEST MODE FOR CARRYING OUT THE INVENTION

In the preferred embodiment of the present invention, a conventional oxygen probe 10 is installed in the wall of a nitriding furnace 102. A system 100, adapted for carrying out the method for controlling the nitriding potential of the gas atmosphere within the nitriding furnace 102, includes a commercially available ammonia dissociator 104 that has an inlet 106 which receives ammonia supply gas from a source of supply gas 107 and an outlet 108 that provides dissociated ammonia carrier gas to the furnace 102 through a valve 116 and a regulatable small flow of dissociated ammonia carrier gas to a reference side 109 of the oxygen probe 10. The dissociated ammonia carrier gas in conduit 108 is a mixture of nitrogen and hydrogen with trace amounts of other equilibrium species including oxygen and water.

The oxygen probe 10 provides a control signal "S", in the range of a few millivolts, to an electrical controller, such as a Eurotherm® high impedance controller 110. A conduit 113 communicates a portion of the ammonia supply gas 107 to the nitriding furnace 102 and has a valve 114 disposed therein. The controller 110 provides an output signal 111 which controls the valve 114 to regulate the flow of ammonia supply gas to the nitriding furnace 102.

Gas nitriding can be controlled by the accurate determination of the nitriding potential within the nitriding furnace 102. This nitriding potential (Kn) is represented by the well known relationship of:

$$K_N = \frac{P^R_{NH_3}}{(P^R_{H_2})^{3/2}}$$

which can be controlled to a pre-selected value by changes to the flow of ammonia supply gas through the conduit 113 or the flow of dissociated ammonia carrier gas through the conduit 108, which is essentially a change in the volume fraction of hydrogen, into the furnace. The controller 110 controls the flow through the valve 114 by the signal line 111 and the flow through the valve 116 by a signal line 118. It has been established that oxygen probes can be used to measure this nitriding potential if fully dissocaited ammonia carrier gas is used at the reference side 109 of the oxygen probe 10. For an accurate process control via the oxygen probe 10, the ammonia supply gas needs to contain small amounts of oxygen or oxygen containing compounds such as water to reduce the influence of any air leakage into the system which would distort the oxygen probe output control signal "S". It should be noted that any reference herein to ammonia is in regards to a supply of ammonia containing small amounts of oxygen or oxygen containing compounds such as water ($H_2O$). By using a conventionally available ammonia dissociator 104, it is ensured that the supply of reference dissociated ammonia carrier gas to the oxygen probe 10 is fully dissociated, improving the accuracy of the output control signal "S" from the oxygen probe 10 and avoiding any temperature influence of internal heated catalysts created in other known systems.

In operation, the oxygen probe 10 is used to control the nitriding process by correlating the millivolt (mV) output signal with the nitriding potential of the gas atmosphere of the nitriding furnace 102. Preferably, the output signal 111 is used to adjust the process gas flow, i.e., the respective ammonia supply gas flow, so that the nitriding potential of the atmosphere within the furnace 102 can be held within close tolerances. The mV control signal differential is processed by the high impedance controller 110, which compares the oxygen set point to the actual mV reading of the probe 10 and makes the necessary flow adjustments to the flow of ammonia supply gas through the control valve 114. Importantly, in the present invention, the reference carrier gas delivered to the probe 10 is fully dissociated ammonia which is cracked in a separate unit, which also supplies the furnace 102 with fully dissociated ammonia carrier gas for nitriding. The fully dissociated ammonia carrier gas, supplied by the ammonia dissociator 104, is delivered to the interior of the oxygen probe 10 through the reference side 109 wherein the differential oxygen pressure is measured in comparison to the furnace atmosphere. After passing through the oxygen probe 10, the reference dissociated ammonia carrier gas is discharged into the furnace exhaust 112.

In the subject embodiment, oxygen or water is mixed with the ammonia gas in the source of supply 107. The mixture of ammonia and oxygen/water is delivered from an ammonia supply source and routed through the dissociator 104 which completely cracks the ammonia supply gas to create a dissociated ammonia carrier gas. The cracked dissociated ammonia carrier gas is then directed to the nitriding furnace 102. The mixture in the source of supply contains a relatively small amount (e.g. less than 10% and preferably about 0.4%) of water to minimize the effects of small amounts of air leakage into the nitride furnace 102 which would distort the probe signal.

Table 1 is a mole balance for all of the significant species in the nitriding atmosphere.

TABLE 1

Mole Balance for Nitriding Process

| Species | "O" From Supply | "EQ" After Dissociation | "R" In Nitrider |
|---|---|---|---|
| $NH_3$ | $\eta^O_{NH_3} = 1$ | $\eta^{EQ}_{NH_3} = 0$ | $\eta^R_{NH_3}$ |
| $H_2O$ | $\eta^O_{H_2O}$ | $\eta^{EQ}_{H_2O} = \eta^O_{H_2O}$ | $\eta^R_{H_2O} = \eta^O_{H_2O}$ |
| $H_2$ | $\dot{0}$ | $\eta^{EQ}_{H_2} = \frac{3}{2}\eta^O_{NH_3}$ | $\eta^R_{H_2} = \frac{3}{2}(\eta^O_{NH_3} - \eta^R_{NH_3})$ |
| $N_2$ | $\dot{0}$ | $\eta^{EQ}_{N_2} = \frac{1}{2}\eta^O_{NH_3}$ | $\eta^R_{N_2} = \frac{1}{2}(\eta^O_{NH_3} - \eta^R_{NH_3})$ |
| Total | $\eta^O_T = 1 + \eta^O_{H_2O}$ | $\eta^{EQ}_T = 2\eta^O_{NH_3} + \eta^O_{H_2O}$ | $\eta^R_T = 2(\eta^O_{NH_3} - \eta^R_{NH_3}) + \eta^O_{H_2O}$ |

The basis of the balance is one mole of gas from the supply tank. Consequently, the only unknowns are ${\eta_{NH_3}}^O$ and ${\eta_{NH_3}}^R$ when the superscripts "O" denote initial condition and "RR" the nitriding furnace condition. The nitriding potential, $K_N$, may be written in terms of these variables.

$$K_N = \frac{P^R_{NH_3}}{(P^R_{H_2})^{3/2}} = \frac{\left[\frac{\eta^R_{NH_3}}{\eta^R_T}\right]P_T}{\left[\frac{\frac{3}{2}(\eta^O_{NH_3} - \eta^R_{NH_3})P_T}{\eta^R_T}\right]^{3/2}} \tag{1a}$$

$$K_N = \frac{\eta^R_{NH_3}\sqrt{2(\eta^O_{NH_3} - \eta^R_{NH_3}) + \eta^O_{H_2O}}}{\left[\frac{3}{2}(\eta^O_{NH_3} - \eta^R_{NH_3})\right]^{3/2}} \tag{1b}$$

The total pressure, $P_T$ is assumed to be 1 atmosphere.

If one assumes $\eta_{H_2O}^{O}$ is small compared to 1, then $K_N$ may be written as:

$$K_N = \frac{\eta^R_{NH_3}\sqrt{2(\eta^O_{NH_3} - \eta^R_{NH_3})}}{\left[\frac{3}{2}(\eta^O_{NH_3} - \eta^R_{NH_3})\right]^{3/2}} \tag{1c}$$

Further simplification is made by introducing the fractional dissociation variable α defined as follows:

$$\alpha = \frac{\eta^O_{NH_3} - \eta^R_{NH_3}}{\eta^O_{NH_3}} = 1 - \frac{\eta^R_{NH_3}}{\eta^O_{NH_3}} \tag{2}$$

When α=1, the $NH_3$ is completely dissociated. Equation (1c) may now be written:

$$K_N = \frac{(1-\alpha)\sqrt{2\alpha}}{\left(\frac{3}{2}\alpha\right)^{3/2}} \tag{3}$$

The probe potential, $U_S$, will now be related to α.

The oxygen probe potential may be determined from the chemical potential of oxygen, $$\mu_{O_2} = \mu^0_{O_2} + RT\ln\frac{P_{O_2}}{P^0_{O_2}} \tag{4}$$

where $\mu_1$ is the standard chemical potential. The chemical potential difference between two other oxygen pressures may be determined by writing Equation (4) for each of the potentials and subtracting them to give $$\Delta\mu = \mu_2 - \mu_1 = \mu^o_{O_2,2} - \mu^o_{O_2,1} + RT\ln\left[\frac{P_{O_2,2}P^0_{O_2,1}}{P_{O_2,1}P^0_{O_2,2}}\right] = RT\ln\left[\frac{P_{O_2,2}}{P_{O_2,1}}\right] \tag{5}$$

which, when expressed as a Nernst Equation gives:

$$U = -\frac{RT}{nF}\ln\left[\frac{P_{O_2,2}}{P_{O_2,1}}\right] = -0.0496T\log\left[\frac{P_{O_2,2}}{P_{O_2,1}}\right] \tag{6}$$

Each partial pressure of $O_2(P_{O_2})$in Equation (6) may be replaced with the corresponding $H_2O/H_2$ ratio. The water equilibrium reaction is $$2H_2+O_2=2H_2O \tag{7}$$

Since $$\Delta G^O = -RT\ln\left[\frac{P_{H_2O}}{P_{H_2}}\right]^2 + RT\ln P_{O_2} = -117{,}800 + 26.2T \tag{8}$$

$$\mathrm{Log}P_{O_2} = -\frac{25{,}743}{T} + 5.725 + 2\mathrm{Log}Q \tag{9}$$

where $$Q = \left[\frac{P_{H_2O}}{P_{H_2}}\right].$$

Substitution of Equation (9) into Equation (6) gives $$U = -0.0496T\mathrm{Log}\left[\frac{Q_2}{Q_1}\right]^2 = -0.0992T\mathrm{Log}\frac{Q_2}{Q_1}\left[\frac{mv}{K}\right] \tag{10}$$

For the oxygen probe, $Q_2=Q_R$ (the reaction gas) and $Q_1=Q_{EQ}$ (the completely dissociated gas).

$$U_S = -0.0992T\mathrm{Log}\frac{Q_R}{Q_{EQ}}\left[\frac{mv}{K}\right] \tag{11}$$

$$\text{where}\quad Q_R = \frac{P^R_{H_2O}}{P^R_{H_2}} \quad\text{and}\quad Q_{EQ} = \frac{P^{EQ}_{H_2O}}{P^{EQ}_{H_2}}$$

If one assumes $\eta_{H_2O}^{O}$ is small compared to $\eta_{NH_3}^{O}$ and substitutes molar values from Table 1 into Dalton's Law of partial pressures, the ratio of $Q_R$ to $Q_{EQ}$ may be restated in terms of $\eta_{NH_3}^{R}$ and $\eta_{NH_3}^{O}$.

$$Q_R = \frac{\left[\frac{\eta^R_{H_2O}}{\eta^R_T}\right]P_T}{\left[\frac{\eta^R_{H_2}}{\eta^R_T}\right]P_T} = \frac{\eta^R_{H_2O}}{\eta^R_{H_2}} = \frac{\eta^O_{H_2O}}{\frac{3}{2}[\eta^O_{NH_3} - \eta^R_{NH_3}]} \tag{12}$$

$$Q_{EQ} = \frac{\left[\frac{\eta^{EQ}_{H_2O}}{\eta^{EQ}_T}\right]P_T}{\left[\frac{\eta^{EQ}_{H_2}}{\eta^{EQ}_T}\right]P_T} = \frac{\eta^{EQ}_{H_2O}}{\eta^{EQ}_{H_2}} = \frac{\eta^O_{H_2O}}{\frac{3}{2}\eta^O_{NH_3}}$$

$$\frac{Q_R}{Q_{EQ}} = \frac{\frac{3}{2}\eta^O_{NH_3}}{\frac{3}{2}[\eta^O_{NH_3} - \eta^R_{NH_3}]} = \frac{1}{\alpha}$$

The cancellation of the $\eta_{H_2O}^{O}$ values is proof that the absolute amount of $H_2O$ does not affect the nitriding potential of the oxygen probe control signal "S" (voltage). However, a small amount of $H_2O$ or oxygen is required to offset any air leakage into the nitriding furnace 102 for a stable oxygen probe voltage Therefore, $$U_S = 0.0992T\mathrm{Log}\alpha\left[\frac{mv}{K}\right] \tag{13}$$

demonstrating that the probe control signal "S" is directly related to the degree of dissociation of ammonia (α), which in turn can be used to calculate the nitriding potential of the nitriding furnace atmosphere.

Industrial Applicability

The method of controlling the atmosphere of a nitriding furnace 102 using the oxygen probe 10 as described above, provides a stable reference dissociated ammonia carrier gas against which the oxygen partial pressure of the furnace atmosphere in the nitriding furnace 102 is measured. The differential voltage control signal "S" is processed by the controller 110 and used to adjust the ammonia supply gas flow so that the nitriding potential can be held within close tolerances. Advantageously, the reference carrier gas of the oxygen probe is fully dissociated ammonia which is cracked in a separate unit 104 which also supplies the furnace 102 with dissociated ammonia carrier gas for nitriding.

Known systems require elaborate arrangements of multiple sensors, used in a complex manner, or heated catalysts within the oxygen probe itself to dissociate any residual ammonia of the reference gas stream. This high dissociation temperature to crack the ammonia within the oxygen probe increases the temperature of the reference gas measuring element and introduces errors into the oxygen partial pressure differential measuring system. The present invention uses a reference carrier gas consisting of dissociated ammonia which is dissociated externally to avoid the problems associated with elevated temperatures within the oxygen probe 10 or at the tip end of the oxygen probe. Furthermore, the source of dissociated ammonia carrier gas to the reference side 109 of the oxygen probe 10 is the same as supplied to the nitriding furnace 102 through the conduit 108.

Although the present invention is described in terms of a preferred exemplary embodiment, those skilled in the art will recognize that changes in the described embodiment may be made without departing from the spirit of the invention. Such changes are intended to fall within the scope of the following claims.

Other aspects, features, and advantages of the present invention may be obtained from a study of this disclosure and the drawing, along with the appended claims.

We claim:

1. A method of controlling the nitriding potential of a nitriding furnace, comprising the steps of:

providing a source of ammonia supply gas containing ammonia and oxygen;

delivering a portion of the ammonia supply gas to a dissociator;

delivering another portion of the ammonia supply gas to the nitriding furnace;

dissociating the ammonia supply gas within the dissociator to create a dissociated ammonia carrier gas;

dividing said dissociated ammonia carrier gas into a first portion and a second portion;

delivering said first portion of said dissociated ammonia carrier gas to said nitriding furnace;

delivering said second portion of said dissociated ammonia carrier gas to an oxygen probe as a reference gas for said oxygen probe;

sensing the oxygen partial pressure differential within the oxygen probe predisposed in said furnace atmosphere;

producing a signal correlation of said oxygen partial pressure differential relative to the nitriding potential; and controlling the ratio of ammonia supply gas to dissociated ammonia carrier gas at the inlet of the nitriding furnace in response to said signal correlation.

2. A method of controlling the atmosphere of a nitriding furnace, as set forth in claim 1, wherein the step of controlling the ratio of ammonia supply gas to dissociated ammonia carrier gas includes the step of controlling the volumetric flow of ammonia supply gas into the nitriding furnace.

3. A method of controlling the atmosphere of a nitriding furnace, as set forth in claim 1, wherein the step of controlling the ratio of ammonia supply gas to dissociated ammonia carrier gas includes the step of controlling the volumetric flow of dissociated ammonia carrier gas into the nitriding furnace.

4. A method of controlling the atmosphere of a nitriding furnace, as set forth in claim 1, wherein said oxygen is in the form of water vapor in an amount less than 10% of said ammonia supply gas.

5. A method of controlling the atmosphere of a nitriding furnace, as set forth in claim 4, wherein said ammonia supply gas contains about 0.4% water vapor.

6. A method of controlling the atmosphere of a nitriding furnace, as set forth in claim 1, wherein the oxygen in the ammonia supply gas is effective to minimize the effects of air leakage into the nitriding furnace.

* * * * *